(12) United States Patent
Chen et al.

(10) Patent No.: US 10,850,490 B2
(45) Date of Patent: Dec. 1, 2020

(54) METHOD FOR MAKING LAMINATED GLASS INTERLAYER FILM AND LAMINATED GLASS AND METHOD FOR MAKING THE LAMINATED GLASS

(71) Applicants: Taiwei Chen, New Taipei (TW); Yang-Jui Cheng, Taipei (TW)

(72) Inventors: Taiwei Chen, New Taipei (TW); Yang-Jui Cheng, Taipei (TW)

( * ) Notice: Subject to any disclaimer, the term of this patent is extended or adjusted under 35 U.S.C. 154(b) by 290 days.

(21) Appl. No.: 15/343,647

(22) Filed: Nov. 4, 2016

(65) Prior Publication Data

US 2017/0136754 A1  May 18, 2017

(30) Foreign Application Priority Data

Nov. 12, 2015  (TW) .............................. 104137267 A

(51) Int. Cl.

| | |
|---|---|
| *B32B 37/10* | (2006.01) |
| *C08J 5/18* | (2006.01) |
| *B32B 17/10* | (2006.01) |
| *B32B 17/06* | (2006.01) |
| *B32B 37/06* | (2006.01) |
| *E06B 3/66* | (2006.01) |
| *E06B 3/673* | (2006.01) |
| *B60J 1/00* | (2006.01) |

(52) U.S. Cl.
CPC .......... *B32B 37/1018* (2013.01); *B32B 17/06* (2013.01); *B32B 17/10788* (2013.01); *B32B 37/06* (2013.01); *C08J 5/18* (2013.01); *E06B 3/6612* (2013.01); *E06B 3/673* (2013.01); *B32B 2250/40* (2013.01); *B32B 2305/72* (2013.01); *B32B 2310/0831* (2013.01); *B32B 2419/00* (2013.01); *B32B 2605/00* (2013.01); *B60J 1/001* (2013.01); *C08J 2323/08* (2013.01); *C08J 2331/04* (2013.01)

(58) Field of Classification Search
CPC . B32B 37/2029; B32B 37/1018; B32B 17/06; B32B 17/10788; B32B 37/06; C08J 5/18; E06B 3/6612; E06B 3/673

USPC ...................................................... 156/275.5
See application file for complete search history.

(56) References Cited

U.S. PATENT DOCUMENTS

2008/0206504 A1* 8/2008 Hayes ..................... B32B 17/10
428/38
2011/0001706 A1* 1/2011 Sanford ................ G06F 3/0412
345/173

FOREIGN PATENT DOCUMENTS

| CN | 101293743 A | 10/2008 |
|---|---|---|
| CN | 101728443 B | 7/2012 |
| CN | 104031567 A | 9/2014 |
| CN | 104356967 A | 2/2015 |
| CN | 103525319 B | 3/2015 |
| EP | 1783159 A1 | 5/2007 |
| EP | 2033942 A1 | 3/2009 |
| EP | 2319884 A1 | 5/2011 |
| EP | 2505595 A1 | 10/2012 |
| EP | 2623470 A1 | 8/2013 |
| EP | 2770541 A1 | 8/2014 |
| JP | 2007254207 A | 10/2007 |
| JP | 2007332007 A | 12/2007 |

OTHER PUBLICATIONS

CN 104031567, English machine translation, Sep. 2014.*
CN 103525319, English machine translation, Mar. 2015.*

* cited by examiner

*Primary Examiner* — Michael N Orlando
*Assistant Examiner* — Elizabeth Bradford
(74) *Attorney, Agent, or Firm* — Fishman & Associates, LLC

(57) ABSTRACT

A method in accordance with the present invention has: providing an ethylene-vinyl acetate copolymer; mixing the ethylene-vinyl acetate copolymer, a photoinitiator, a coupling agent, a crosslink-assisting agent, an ultraviolet light absorber, and a radical scavenger to obtain a mixture; and forming the mixture into a film at a specific temperature to obtain the laminated glass interlayer film. The laminated glass in accordance with the present invention is has high transmittance and low haze, and also shortens the production time, thereby enhancing the quality and applicability.

7 Claims, No Drawings

METHOD FOR MAKING LAMINATED GLASS INTERLAYER FILM AND LAMINATED GLASS AND METHOD FOR MAKING THE LAMINATED GLASS

BACKGROUND OF THE INVENTION

1. Field of the Invention

The present invention relates to a laminated glass used in a building or a vehicle, and more particularly to an interlayer film and a method and a finished product of a laminated glass comprising said interlayer film.

2. Description of the Prior Art

Glass has been widely used in various buildings, vehicles and display devices due to the characteristics of transparency, air-tightness, high strength and high hardness.

In order to enhance the safety and applicability of large area glass sheets, a conventional laminated glass comprises a layer of polyvinyl butyral (PVB) glued between two glass sheets to produce various types of safety glass and windshield.

In addition, in order to enhance the penetration resistance and impact resistance of the laminated glass, another conventional interlayer film comprises a PVB layer and a cross-linked EVA layer comprising a composition having an ethylene-vinyl acetate copolymer containing organic peroxide.

Chinese Patent No. 101410341 B disclosed an invention of using peroxide such as 1,1-bis (t-butylperoxy) 3,3,5-trimethylcyclohexane as a cross-linking agent for performing a thermo-curing crosslinking reaction, which, however, results into a cross-linked EVA layer liable to foaming, and renders insufficient the weather resistance and adhesion of a laminated glass having the cross-linked EVA layer as the interlayer film.

In view of the foregoing, Japanese Patent Application Publication No. 2013-0745409 disclosed a laminated glass interlayer film which is coated with a photo-cured EVA on a PET film to improve the adhesion of the laminated glass and improve the weather resistance of the laminated glass. However, as shown in Table 1 of the aforementioned patent application publication, the laminated glass interlayer film has a drawback that the haze is unacceptably high and that the production cost is expensive.

In view of the above, the object of the present invention is to overcome the problem of poor haze of the conventional laminated glass and to shorten the production time of the laminated glass, thereby improving the applicability of the laminated glass.

SUMMARY OF THE INVENTION

The main objective of the invention is to provide a method for making a laminated glass interlayer film.

The above said method in accordance with the present invention has:

(A) Providing an ethylene-vinyl acetate copolymer (EVA copolymer);

(B) Mixing the ethylene-vinyl acetate copolymer, a photoinitiator, a coupling agent, a crosslink-assisting agent, an ultraviolet light absorber, and a radical scavenger to obtain a mixture;

(C) Forming the mixture into a film at a specific temperature to obtain the laminated glass interlayer film.

Preferably, the ethylene-vinyl acetate copolymer comprises 5 wt % to 70 wt % of vinyl acetate groups. More preferably, the ethylene-vinyl acetate copolymer comprises 15 wt % to 50 wt % of vinyl acetate groups. Most preferably, the ethylene-vinyl acetate copolymer comprises 20 wt % to 35 wt % of vinyl acetate groups. By controlling the content of vinyl acetate groups in the ethylene-vinyl acetate copolymer, it is possible to ensure the high transparency of the obtained laminated glass interlayer film when it is applied to the laminated glass.

Preferably, the ethylene-vinyl acetate copolymer has a melt flow rate (MFR) ranging from 5 g/10 min to 50 g/10 min. More preferably, the ethylene-vinyl acetate copolymer has a melt flow rate ranging from 10 g/10 min to 30 g/10 min. Most preferably, the ethylene-vinyl acetate copolymer has a melt flow rate ranging from 18 g/10 min to 30 g/10 min. Herein, the melt flow rate of the ethylene-vinyl acetate copolymer is measured in accordance with ASTM D1238 of the American Society for Testing and Materials, and the test temperature condition is 190° C. and the pressure is 2.16 Kgf. Accordingly, by controlling the melt flow rate of the ethylene-vinyl acetate copolymer within a certain range, it is possible to ensure a good flowability of the obtained cemented-glass interlayer film when it is applied to a cemented glass, so as to provide good tensile strength.

Preferably, the photoinitiator includes a cleavage-type photoinitiator such as a benzoin-based compound, a hydrogen-abstraction type photoinitiator such as a benzophenone-based compound, a cationic photoinitiator such as a sulfuronium compound or an iodonium compound, and other compounds that produce free radicals upon exposure to light.

More specifically, commercially available benzoin-based compounds include, but are not limited to, compounds such as: 1-hydroxy-cyclohexyl phenyl ketone, 2,2-dimethoxy-2-phenylethanone, 2-hydroxy-2-methylpropiophenone, and diphenyl (2,4,6-trimethylbenzoyl) phosphine oxide. Commercially available benzophenone-based compounds include, but are not limited thereto, compounds such as: benzophenone, 4-phenyl benzophenone, 2-isopropylthioxanthone, 2,4-diethylthioxanthone, 4-(4'-methylphenylthio) benzophenone. Commercially available cationic photoinitiators include, but are not limited thereto, compounds such as: triarylsulfonium hexafluorophosphate salts (mix of mono and bis salts), 4-isobutylphenyl-4'-methylphenyliodonium hexafluorophosphate ((4-methylphenyl) [4-(2-methylpropyl)phenyl] iodonium hexafluorophosphate), 4-thiophenyl phenyl diphenyl sulfonium hexafluoroantimonate, (thiodi-4,1-phenylene) bis (diphenylsulfonium) hexafluoroantimonate, tris(4-(4-acetylphenyl)thiophenyl)sulfonium hexafluorophosphate, tris(4-(4-acetylphenyl)thiophenyl)sulfonium, tetrakis(pentafluorophenyl)borate, and diphenyl ethanedione dimethyl ketal. Foregoing photoinitiators may be used singly or in combination of two or more.

Preferably, the photoinitiator is used in an amount of from 0.1 wt % to 10 wt % based on the total amount of the mixture. More preferably, the amount of photoinitiator used, based on the total amount of the mixture, ranges from 0.5 wt % to 5 wt %. Most preferably, based on the total amount of the mixture, the content is used in an amount of from 1 wt % to 3 wt %.

Preferably, the crosslink-assisting agent may be a polyfunctional monomer or oligomer containing an acrylic group, or a multifunctional monomer or oligomer containing a vinyl group. More specifically, the acrylic functional group-containing polyfunctional monomers or oligomers include, but are not limited to, compounds such as: trimethylolpropane triacrylate, trimethylolpropane trimethacrylate, pentaerythritol triacrylate, and dipentaerythritol hexaacrylate. The vinyl-containing polyfunctional monomers or oligomers include, but are not limited to, compounds such as: triallyl cyanurate, triallyl isocyanurate, triallyl cyanurate, trimethylolpropane triallyl ether, 2,2-bis (hydroxymethyl)-1,3-propanediol allyl ether (pentaerythritol allyl ether). Foregoing crosslink-assisting agents may be used singly or in combination of two or more.

Preferably, the amount of the crosslink-assisting agent ranges from 0.1 wt % to 4 wt %, based on the total amount of the mixture. More preferably, the amount of crosslink-assisting agent, based on the total amount of the mixture, ranges from 0.5 wt % to 4 wt %. Most preferably, the amount of crosslink-assisting agent, based on the total amount of the mixture, ranges from 1 wt % to 3 wt %.

Preferably, the radical scavenger may be a hindered phenol antioxidant, or a hindered amine light stabilizer. More specifically, the hindered amine light stabilizer is exemplified by, but not limited to: 2,2,6,6-tetramethyl-4-benzoyloxypiperidine, bis (2,2,6,6-tetramethyl-4-piperidinyl) sebacate, bis(1,2,2,6,6-pentamethyl-4-piperidyl) sebacate), bis(1,2,2,6,6-pentamethyl-4-piperidinyl) sebacate, methyl 1,2,2,6,6-pentamethyl-4-piperidyl sebacate, bis(1,2,2,6,6-pentamethyl-4-piperidinyl) (3,5-di-tert-butyl-4-hydroxybenzyl)butylpropanedioate, poly(4-hydroxy-2,2,6,6-tetramethyl-1-piperidine ethanol-alt-1,4-butanedioic acid, poly((6-((1,1,3,3-tetramethylbutyl)amino)-1,3,5-triazine-2,4-diyl)((2,2,6,6-tetramethyl-4-piperidinyl)imino)-1,6-hexanediyl((2,2,6,6-tetramethyl-4-piperidinyl)imino)).

More specifically, the hindered phenol antioxidant is, exemplified by, but not limited to: 2,6-bis(tert-butyl)-4-methylphenol, octadecyl 3-(3,5-di-tert-butyl-4-hydroxyphenyl) propionate, pentaerythritol tetrakis(3-(3,5-di-tert-butyl-4-hydroxyphenyl)propionate), 1,2-bis(3,5-di-tert-butyl-4-hydroxyhydrocinnamoyl) hydrazide, 1,6-bis(3,5-di-tert-butyl-4-hydroxyhydrocinnamido)hexane, 3,5-Bis(1,1-dimethylethyl)-4-hydroxybenzenepropanoic acid thiodi-2,1-ethanediyl ester, 1,3,5-trimethyl-2,4,6-tris(3,5-di-tert-butyl-4-hydroxybenzyl) benzene, tris(3,5-di-tert-butyl-4-hydroxybenzyl) isocyanurate, tris(4-tert-butyl-3-hydroxy-2,6-dimethylbenzyl) isocyanurate. Foregoing radical scavengers may be used singly or in combination of two or more.

Preferably, the amount of the radical scavenger ranges from 0.01 wt % to 5 wt %, based on the total amount of the mixture. More preferably, the amount of the radical scavenger, based on the total amount of the mixture, ranges from 0.1 wt % to 0.5 wt %.

Preferably, the coupling agent may be a metal coupling agent or a silane coupling agent. More specifically, the metal coupling agent is exemplified by, but not limited to: tetra-n-propyl zirconate, tetra-n-butyl zirconate, titanate coupling agent LICA 12, titanate Coupling Agent LICA 38, butyl titanate phosphate, and titanium diisopropoxide bis(acetylacetonate). The silane coupling agent is exemplified by, but not limited to: 3-(methacryloxypropyl) trimethoxysilane, 3-(methacryloyloxy) propyltriethoxysilane, (3-glycidoxypropyl) trimethoxysilane), (3-glycidoxypropyl) triethoxysilane, 3,4-epoxycyclohexylthyltrimethoxysilane, 3-aminopropyltriethoxysilane, and trimethoxysilyl ethene. Foregoing coupling agents may be used singly or in combination of two or more.

Preferably, the amount of the coupling agent ranges from 0.01 wt % to 10 wt %, based on the total amount of the mixture. More preferably, the amount of the coupling agent ranges from 0.05 wt % to 1 wt %, based on the total amount of the mixture. Most preferably, based on the total amount of the mixture, the amount of the coupling agent is used in an amount of from 0.1 wt % to 0.5 wt %.

Preferably, the ultraviolet light absorber may be hydroxybenzophenone-based compound (HBP), benzotriazole-based compound (BTZ), triazine-based compound (HPT), or benzoate-based compound. More specifically, the hydroxybenzophenone-based compound is exemplified by, but not limited to: 2-hydroxy-4(octloxyl) benzophenone, 2,2',4,4'-tetrahydroxy benzophenone, and 2,2'-dihydroxy-4,4'-dimethoxy benzophenone. More specifically, the benzotriazole-based compound is exemplified by, but not limited to: 2-(2'-hydroxy-3,5-di-tert-amylphenyl) benzotriazole, 2-(2-hydroxy-5-t-octylphenyl)benzotriazole, and 2-(2-hydroxy-3,5 dicumyl) benzotriazole. More specifically, the triazine-based compound is exemplified by, but not limited to: a mixture of [2-[4-[2-hydroxy-3-tridecyloxypropyl]oxy]-2-hydroxyphenyl]-4,6-bis (2,4-dimethylphenyl)-1,3,5-triazine and [2-[4-[2-hydroxy-3-dodecyl oxypropyl]oxy]-2-hydroxyphenyl]-4,6-bis(2,4-dimethylphenyl)-1,3,5-triazine, 2-[2-Hydroxy-4-[3-(2-ethylhexyl-1-oxy)-2-hydroxy propyloxy]phenyl]-4,6-bis(2,4-dimethylphenyl)-1,3,5-triazine, 2-(hydroxy-4-[1-octyloxycarbonylethoxy]phenyl)-4,6-bis (4-phenylphenyl)-1,3,5-triazine, 2-(4,6-Diphenyl-1,3,5-triazin-2-yl)-5-[(hexyl)oxy]-phenol, and 2-(4,6-Bis-(2,4-dimethylphenyl)-1,3,5-triazin-2-yl)-5-(octyloxy)-phenol. More specifically, the benzoate-based compound is exemplified by, but not limited to: 2,4-di-t-butyl phenyl 3,5-di-t-butyl-4-hydroxybenzoate, dimethyl 4-methoxybenzylidenemalonate, and p-phenylenebis(methylenemalonic acid) tetraethyl ester. These ultraviolet light absorbers may be used singly or in combination of two or more.

Preferably, the ultraviolet light absorber is used in an amount of from 0.01 wt % to 10 wt %, based on the total amount of the mixture. More preferably, the amount of the ultraviolet light absorber, based on the total amount of the mixture, ranges from 0.1 wt % to 1 wt %.

In the above step (B), materials and reagents including the ethylene-vinyl acetate copolymer, the photoinitiator, the coupling agent, the crosslink-assisting agent, the ultraviolet light absorber, and the radical scavenger can be added in a batchwise manner into a mixing tank for uniformly mixing. The materials and reagents may also be added into the mixing tank at the same time for uniformily mixing. It is also possible to add the materials and reagents in sequence into a twin-screw extruder to be uniformly mixed.

In the step (C) of the aforesaid method, the mixture can be uniformly mixed in and then cast from a single-screw extruder, or a twin-screw extruder directly into a film, in order to obtain an interlayer film of the laminated glass.

In the step (C) of the method, the specific temperature is between 80° C. and 130° C. Preferably, the specific temperature is between 85° C. and 110° C.

The invention also relates to a method for making a laminated glass having:

(A) Sandwiching a laminated glass interlayer film obtained by the method of the preceding method between two glass sheets to obtain a laminated structure;

(B) Vacuum laminating the laminate structure at a lamination temperature;

(C) Applying 4 Joules (J) to 12 J of ultraviolet light or visible light to the laminated structure at a photo-curing temperature to obtain the laminated glass.

In order to achieve higher transmittance and lower haze value, preferably, in step (B) of the method, the lamination temperature is greater than or equal to 90° C. and less than or equal to 150° C.; in order to perform the method with a lower temperature conducive to lowering cost, preferably, in the step (B) of the method, the lamination temperature is greater than or equal to 75° C. and less than 90° C.

In order to achieve higher transmittance and lower haze value, preferably, in the step (C) of the method, the photo-curing temperature under which the laminate is continuously irradiated is greater than or equal to 100° C. and less than or equal to 140° C. to obtain the cemented glass. In order to perform the method with a lower temperature conducive to lowering cost, preferably, in the step (C) of the method, the photo-curing temperature is greater than or equal to 75° C. and less than 100° C.

The present invention further relates to a laminated glass, obtained by the method of the preceding method, comprising two glass sheets and a photo-curable interlayer film sandwiched between the two glass sheets.

Compared with the prior art that polyvinyl butyral film is used as the interlayer film or that the conventional laminated glass is heat-cured, the laminated glass in accordance with the present invention having the light-cured polyethylene vinyl acetate interlayer film prepared by photo-curing method can solve the problem that the conventional laminated glass is high in haze and production cost and tends to delaminate. The laminated glass in accordance with the present invention also shortens the production time from 4 hours to to as short as 3 to 5 minutes, thereby enhancing the quality and applicability.

DETAILED DESCRIPTION OF THE PREFERRED EMBODIMENTS

Hereinafter, embodiments of the present invention will be described with reference to specific examples. Those skilled in the art will readily appreciate the advantages and utility of the present invention through the present description of the instant specification. Modifications and variations can be made without departing from the spirit of the present invention in implementing or applying the present invention.

Materials

1. EVA particles, commodity model: UE2828, purchased from USI Corporation.
2. PVB film, product model: WINLITE®, purchased from ChangChun PetroChemical., Co. Ltd.
3. PVB film, product model: Saflex DG, purchased from EASTMAN.
4. Photoinitiator: 4-(4'-methylphenylthio) benzophenone, product type: Chemcure-BMS, purchased from Chembridge International Corp.
5. Photoinitiator: 2-isopropylthioxanthone, product model: Daracure ITX, purchased from Ciba company.
6. Photoinitiator: 2,4-diethyl thioxanthone, product model: KAYACURE DETX-S, purchased from Nippon Kayaku Co., Ltd.
7. Photoinitiator: diphenyl ethanedione dimethyl ketal, product model: Irgacure 651, purchased from BASF (Baden Aniline and Soda Factory).
8. Crosslink-assisting agent: Trimethylolpropane triacrylate, product model: Laromer® TMPTA, purchased from BASE
9. Coupling agent: 3-(methacryloyloxy) propyltrimethoxysilane, product model: KBM-503, purchased from Shin-Etsu Chemical Co. Ltd.
10. Radical scavenger: bis (2,2,6,6-tetramethyl-4-piperidyl) sebacate, product model: Tinuvin 770, purchased from BASF.
11. UV absorber: 2,2'-dihydroxy-4,4'-dimethoxybenzophenone, product model: Uvinul 3049, purchased from BASF.

Examples 1 to 3: Laminated Glass Interlayer Films

The EVA particles were first put into a stirring tank, and the stirring was continued for 6 minutes. Then, photoinitiators, crosslink-assisting agents, coupling agents, radical scavengers, and ultraviolet light absorbers were sequentially added according to the ratios shown in Table 1 below. After stirring for 15 minutes, a mixture was obtained.

The MFR of the selected EVA particles was 28 g/10 min at 190° C. and the EVA particles contained 28 wt % vinyl acetate groups.

Subsequently, the mixture was placed in a thermoforming machine and hot-pressed at a temperature of 110° C. for 1 minute to obtain a sample film, and the sample film was cut into a plurality of pieces of laminated glass interlayer films each having a size of 5 cm×5 cm.

Comparative Example 1: Laminated Glass Interlayer Film

The EVA particles were first put into a stirring tank, and the stirring was continued for 6 minutes. Then, photoinitiators, crosslink-assisting agents, coupling agents, radical scavengers, resin adhesives and ultraviolet light absorbers were sequentially added according to the ratios shown in Table 1 below. After stirring for 15 minutes, a mixture was obtained.

Subsequently, the mixture was placed in a thermoforming machine and hot-pressed at a temperature of 110° C. for 1 minute to obtain a sample film, and the sample film was cut into a plurality of pieces of laminated glass interlayer films each having a size of 5 cm×5 cm.

TABLE 1

|  |  | Example number | | |
|---|---|---|---|---|
|  |  | Example 1 | Example 2/3 | Comparative Example 1 |
| EVA | UE2828 | 100 | 100 | 100 |
| Photoinitiator | Chemcure-BMS | 2 | 2 | 0 |
|  | Daracure ITX | 0.5 | 0 | 0 |
|  | KAYACURE DETX-S | 0 | 0.5 | 0 |
|  | Irgacure 651 | 0 | 0 | 2.5 |
| Crosslink-assisting agent | Laromer(R) TMPTA | 2.5 | 2.5 | 2.5 |
| Coupling agent | KBM-503 | 0.3 | 0.3 | 0.3 |
| Radical scavenger | Tinuvin770 | 0.3 | 0.3 | 0.3 |
| Ultraviolet light absorber | Uvinul3049 | 0.3 | 0.3 | 0.3 |

Making Laminated Glasses with the Interlayer Films of Examples 1 to 3, and Comparative Example 1

First, two pieces of glass sheets each having a size of 5 cm×5 cm and a thickness of 5 mm were prepared, and a sheet of a laminated glass interlayer film (obtained in Examples 1 to 3 or Comparative Example 1) of the size of 5 cm×5 cm is sandwiched between the glass sheets to obtain a laminated structure.

For Examples 1 and 2 and Comparative Example 1, the laminated structure was then placed in a vacuum laminator. The laminated structure was heated at a lamination temperature of 140° C., and was continuously vacuumed for 3 minutes. 10 J of light was applied to the laminated structure at a photo-curing temperature of 140° C. The laminated structure was then taken out to complete the production of the laminated glass. For Example 3, the laminated structure was then placed in a vacuum laminator. The laminated structure was heated at a lamination temperature of 75° C., and was continuously vacuumed for 12 minutes. 10 J of light was applied to the laminated structure at a photo-curing temperature of 75° C. The laminated structure was then taken out to complete the production of the laminated glass.

The production time required for each laminated glass, the time required for the EVA film to be exposed, and the thickness of the EVA film in the laminated glass are shown in Table 2 below. The time required to produce the laminated glass comprises the time required for lamination and the time for exposure.

Comparative Examples 2 and 3: Conventional Laminated Glass

Comparative Example 2 used the aforementioned WIN-LITE as the interlayer film, and Comparative Example 3 used the Saflex DG of EASTMAN as the interlayer film.

Two glass sheets of 5 cm×5 cm in size and 5 mm in thickness were prepared, and an interlayer film having a size of 5 cm×5 cm was sandwiched between the glass sheets to obtain a laminated structure. The laminated structure was pre-pressed as described in the technical data, and then placed into the high temperature and high pressure furnace for 4 hours, which completed the production of the laminated glass.

Test Example: Analysis of the Properties of Laminated Glasses

1. Gel Content:
Analysis method: ASTM D2765-11.
2. Transmittance, Haze:
Analysis method: ASTM D1003-11, with two clear glass sheets of 5 mm in thickness.
3. Delamination:
Analysis method: ISO12543. Laminated glass products are placed at 100° C. for 2 hours in boiling water to inspect for delamination. The production time of this laminated glass extends to 4 hours, which is not conducive to mass production.

In contrast to the results of the analysis shown in the above Table 2, the laminated glass comprising the interlayer film of Example 1, Example 2 or Example 3 was able to provide both a high transmittance and a low haze. An outfacing window of a building, a car glass, or a windshield made of the laminated glass comprising the interlayer film of Example 1, Example 2 or Example 3 significantly benefits by the low haze and high light transmittance. The production time required for the laminated glass of the present invention is only 5 minutes or less. Furthermore, the laminated glass comprising the interlayer film of Example 1, Example 2 or Example 3, which is high in crosslinking ratio, is capable of more specifically avoiding delamination problems.

What is claimed is:
1. A method for making a laminated glass interlayer film, comprising the steps of:
   a) providing an ethylene-vinyl acetate copolymer;
   b) mixing an ethylene-vinyl acetate copolymer, an initiator, a coupling agent, a crosslink-assisting agent, an ultraviolet light absorber, and a radical scavenger to obtain a mixture, wherein the mixture consists of the ethylene-vinyl acetate copolymer, the initiator, the coupling agent, the crosslink-assisting agent, the ultraviolet light absorber, and the radical scavenger, and the initiator consists of a photoinitiator; and
   c) forming the mixture at a specific temperature to obtain the laminated glass interlayer film consisting of the mixture; wherein the ethylene-vinyl acetate copolymer contains 5 wt % to 70 wt % vinyl acetate groups; the ethylene-vinyl acetate copolymer has a melt flow rate ranging from 5 g/10 min to 50 g/10 min; the amount of the photoinitiator ranges from 0.1 wt % to 10 wt % based on the total amount of the mixture; the amount of the crosslink-assisting agent ranges from 0.1 wt % to 4

TABLE 2

Property analysis results of Examples 1 to 3 and Comparative Examples 1 to 3

|  | Example 1 | Example 2 | Example 3 | Comparative Example 1 | Comparative Example 2 | Comparative Example 3 |
|---|---|---|---|---|---|---|
| Time for laminated glass production | 5 minutes | 5 minutes | 15 minutes | 5 minutes | 4 hours | 4 hours |
| Time for EVA film exposure | 120 seconds | 120 seconds | 120 seconds | 120 seconds | — | — |
| Thickness of EVA film | 0.4 mm | 0.4 mm | 0.4 mm | 0.4 mm | 0.38 mm | 0.38 mm |
| Crosslinking ratio | 75% | 85% | 87% | 52% | — | — |
| Transmittance | 80% | 83% | 88% | 75% | 93% | 90% |
| Haze | 1.5% | 0.9% | 0.4% | 20% | 0.8% | 1.1% |
| Delamination | Not observed | Not observed | Not observed | Not observed | Observed | Observed |

As shown in the above Table 2, it was confirmed that a laminated glass comprising the interlayer film of Comparative Example 1 had a high haze and a low transmittance, which is a significant defect when implemented as a product of greater thickness such as an outfacing window of a building, a car glass, or a windshield. The high haze and low transmittance of the laminated glass product adversely affects the functionalities of such products. A laminated glass comprising the PVB film of Comparative Example 2 or Comparative Example 3 as the interlayer film is liable to wt %; the amount of the coupling agent ranges from 0.01 wt % to 10 wt %; the coupling agent comprises tetra-n-propyl zirconate, tetra-n-butyl zirconate, titanate coupling agent LICA 12, titanate coupling agent LICA 38, butyl titanate phosphate, and titanium diisopropoxide bis(acetylacetonate), 3-(methacryloxypropyl) trimethoxysilane, 3-(methacryloyloxy) propyltriethoxysilane, (3-glycidoxypropyl) trimethoxysilane), (3-glycidoxypropyl) triethoxysilane, 3,4-epoxycyclohexylthyltrimethoxysilane, 3-aminopropyltriethoxysilane, or trimethoxysilyl ethene; the photoinitiator comprises a benzoin-based compound, a benzophenone-based compound or a rhodium-based compound; the ultraviolet light absorber comprises a benzophenone-based compound, a triazine-based compound or an amide-based compound; the crosslink-assisting agent comprises a polyfunctional compound containing an acrylic group or a vinyl group; the radical scavenger comprises a hindered phenol antioxidant or a hindered amine light stabilizer.

2. The method as claimed in claim 1, wherein the photoinitiator is a benzophenone-based compound.

3. A method for making a laminated glass, comprising the steps of:
   a) sandwiching a laminated glass interlayer film prepared as described in claim 1 between two glass sheets to obtain a laminated structure;
   b) vacuum laminating the laminated structure at a lamination temperature;
   c) applying an ultraviolet or visible light of 4 J to 12 J to the laminated structure at a photo-curing temperature to produce the laminated glass.

4. The method as claimed in claim 3, wherein the lamination temperature ranges from greater than or equal to 90° C. to less than or equal to 150° C.

5. The method as claimed in claim 3, wherein the lamination temperature ranges from greater than or equal to 75° C. to less than 90° C.

6. The method as claimed in claim 3, wherein the photo-curing temperature ranges from greater than or equal to 100° C. to less than or equal to 140° C.

7. The method as claimed in claim 3, wherein the photo-curing temperature ranges from greater than or equal to 75° C. to less than 100° C.

* * * * *